US 9,858,320 B2

(12) United States Patent
Gkoulalas-Divanis et al.

(10) Patent No.: US 9,858,320 B2
(45) Date of Patent: Jan. 2, 2018

(54) MINING PATTERNS IN A DATASET (71) Applicant: International Business Machines Corporation, Armonk, NY (US)

(72) Inventors: Aris Gkoulalas-Divanis, Dublin (IE); Michael Wurst, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 432 days.

(21) Appl. No.: 14/524,240

(22) Filed: Oct. 27, 2014

(65) Prior Publication Data

US 2015/0134650 A1    May 14, 2015

(30) Foreign Application Priority Data

Nov. 13, 2013 (GB) .................................. 1320016.7

(51) Int. Cl.
*G06F 17/30* (2006.01)
(52) U.S. Cl.
CPC .. *G06F 17/30539* (2013.01); *G06F 17/30572* (2013.01)
(58) Field of Classification Search
CPC .................... G06F 17/30572; G06F 17/30864
USPC ................................................. 707/776–777
See application file for complete search history.

(56) References Cited

U.S. PATENT DOCUMENTS

| | | | |
|---|---|---|---|
| 6,003,029 A | 12/1999 | Agrawal et al. | |
| 6,772,152 B2 | 8/2004 | Wang et al. | |
| 6,799,175 B2 | 9/2004 | Aggarwal | |
| 8,407,164 B2 | 3/2013 | Malik et al. | |
| 2002/0103775 A1 | 8/2002 | Quass et al. | |
| 2002/0193981 A1 | 12/2002 | Keung et al. | |
| 2008/0071656 A1 | 3/2008 | Steuben et al. | |
| 2011/0320441 A1 | 12/2011 | Lee et al. | |
| 2013/0144813 A1* | 6/2013 | Sengupta | G06N 5/022 706/12 |

FOREIGN PATENT DOCUMENTS

| | | |
|---|---|---|
| CN | 102298612 A | 12/2011 |
| CN | 102779136 A | 11/2012 |
| WO | 2007104612 A1 | 9/2007 |

OTHER PUBLICATIONS

Agrawal, Rakesh, et al; "Fast Algorithms for Mining Association Rules"; Proceedings of the 20th VLDB Conference Santiago, Chile; p. 1-9; 1994.

(Continued)

*Primary Examiner* — Thu-Nguyet Le
(74) *Attorney, Agent, or Firm* — Cantor Colburn LLP (57) ABSTRACT

Accessing data in a database includes receiving, from a first user, a first query for a dataset stored in a database. A first set of patterns is provided in the dataset. For each pattern in the first set of patterns, a significance value is provided in response to the received first query. A set of tags is provided for flagging a pattern of the first set of patterns, the set of tags indicating at least two data categories describing the pattern. Input information received from the first user indicates tags of at least a first subset of patterns of the first set of patterns, wherein each tag of the tags is selected from the set of tags. The significance values of the first subset of patterns are adjusted based on the tags.

18 Claims, 4 Drawing Sheets

(56) References Cited

OTHER PUBLICATIONS

Atzmuller, Martin; "Subgroup Discovery"; Künstliche Intelligenz; vol. 4; p. 1-3; 2005.
Basu, Sugato, et al.; "A Probabilistic Framework for Semi-Superivsed Clustering"; Proceedings of the Tenth ACM SIGKDD International Conference on Knowledge Discovery and Data Mining; p. 59-68; Aug. 2004.
Guo, Zhenyu; "Visually Mining Interesting Patterns in Multivariate Datasets"; A PhD Dissertation in Computer Science; p. 1-106; Dec. 2012.
Leonhardi, Benjamin, et al.; "Augmenting OLAP Exploration with Dynamic Advanced Analytics"; EDBT 2010; p. 1-6; Mar. 22-26, 2010.
Liu, Hongyan, et al.; "Mining Frequent Patterns from Very High Dimensional Data: A Top-Down Row Enumeration Approach"; Proceeding of the 2006 SIAM International Conference on Data Mining (SDM'06); p. 280-291; 2006.
Scholz, Martin; "Sampling-Based Sequential Subgroup Mining"; KDD'05, p. 1-10; Aug. 21-24, 2005.
Su, Xiaoyian, et al.; "A Survey of Collaborative Filtering Techniques"; Advances in Artificial Intelligence vol. 2009; p. 1-19; 2009.
Xin, Dong, et al.; "Discovering Interesting Patterns Through User's Interactive Feedback"; KDD 06; p. 1-6; Aug. 20-23, 2006.
IBM; "IBM SPSS Modeler 15 User's Guide"; p. 1-270; 1994, 2012.

\* cited by examiner

MINING PATTERNS IN A DATASET

BACKGROUND

The invention relates generally to computing systems, and more specifically to a method for mining patterns in a dataset.

Identifying relevant data patterns in datasets e.g. high-dimensional datasets is often challenging. In particular, finding patterns that others overlook is a key competitive advantage for companies that rely on big data analytics.

SUMMARY

Embodiments include a method, system, and computer program product for accessing data in a database system. A method includes receiving, from a first user, a first query for a dataset stored in a database. A first set of patterns is provided in the dataset. For each pattern in the first set of patterns, a significance value is provided in response to the received first query. A set of tags is provided for flagging a pattern of the first set of patterns, the set of tags indicating at least two data categories describing the pattern. Input information received from the first user indicates tags of at least a first subset of patterns of the first set of patterns, wherein each tag of the tags is selected from the set of tags. The significance values of the first subset of patterns are adjusted based on the tags.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments provide an improved method, system, and computer program product for accessing data in a database system that includes a receiver module, a pattern module and an analysis module. The term "data pattern" or "pattern" as used herein refers to any kind of relationship, form, template, model or a set of rules which can be used to describe correlations by which individual items of the data set are linked. The receiver module receives a first query for a dataset stored in the database system from a first user. The pattern module provides a first set of patterns in the dataset and, for each pattern in the first set of patterns, a significance value in response to the received first query. The pattern module also provides a set of tags for flagging a pattern of the set of patterns, where the set of tags indicates at least two data categories describing the pattern. The receiver module receives, from the first user, input information indicating tags of at least a first subset of patterns of the first set of patterns, where each tag of the tags is selected from the set of tags. The analysis module adjusts the significance values of the first subset of patterns based on the tags.

On future queries, patterns may be re-ranked according to the adjusted significance values. The method may further include receiving from another user the first query for the dataset; ranking patterns that satisfy the first query using the updated/adjusted significance values; and providing another set of patterns in response to the received first query, where the other set of patterns includes patterns having significance values higher than the significance threshold value.

The set of patterns may include all patterns that satisfy the first query of the first user. Alternatively, the set of patterns may include patterns having significance values higher than a significance threshold value. The significance values may be provided and/or calculated, for example, by the Apriori algorithm (or any suitable algorithm) that is a model for mining association rules from Databases. At least two data categories may be a noise, trivial and valid data category. That is, a pattern may be a noise, valid or trivial pattern. A noise pattern may result from a random process that appears in conjunction with a systematic process without meaning. A noise pattern can be caused by hardware failures, programming errors spelling errors or abbreviations. For example, measures of CPU usage may be wrong when there is an issue with the software. The noise pattern may also include pattern associated with corrupt data or any pattern that cannot be read or used by a program.

A pattern may be considered to be trivial if it may be known to a practitioner in a field. For example, the pattern according to which an "out of memory error" is always followed by a "spike in CPU usage" is known in the field of computing. Such pattern may thus be flagged as trivial. In another example, the frequency of appearance of a pattern may be used to determine whether that pattern is trivial or not. For example, if a pattern appears in the computer system since a long time period. Such as one year, and it is frequency of appearance for the queries of the first user is higher than a predetermined threshold e.g. once per day then it may be classified automatically or by the first user as trivial.

A pattern may be considered valid if it is neither noise nor a trivial pattern and valid for analysis. The first subset of patterns may include at least part of the set of patterns. These features may be advantageous as they may provide an accurate method for evaluating patterns in a dataset that may be used for performing a reliable ranking of the patterns for a future usage. This may allow valid, but statistically insignificant patterns that would have been easily overlooked, to be promoted in the system, while highly significant but trivial patterns that would appear on the top of a result list, to be down-rated. Ensuring a reliable ranking of patterns may have the advantage that resources may be saved that would otherwise be required when performing multiple attempts of queries to get the right (ranked) patterns that may satisfy the user needs.

Another advantage may be that these features may increase the capacity of the database system by servicing more users. More users may be serviced with the present method because a user request may be quickly satisfied, for example after the first or the second request attempt. This is in contrast to the conventional method where a user may have to perform multiple attempts to satisfy his needs and thus may occupy the database system longer than when using the present method. Thus, this may also help providing additional services that may overcome poor quality of service (QoS) that may result due to non-optimal evaluation and thus ranking of patterns.

Another advantage may be that the present method may be seamlessly integrated in the existing systems as it may be implemented with a low software and/or hardware burden. The method blocks of this embodiment may be repeated at different time intervals e.g. the first user may send the first query once every day.

According to one embodiment, a first pattern of the first subset of patterns is flagged with a first tag of the set of tags and adjusting of the significance value of the first pattern. The method includes assigning, to the first pattern and the first user, a set of tag counters corresponding to the set of tags respectively; initializing the values of the set of tag counters; incrementing the tag counter of the set of tag counters corresponding to the first tag; using the set of tag counters including the incremented tag counter to adjust the significance value of the first pattern. The set of tag counters are initialized only once. For example, when the first query is submitted by a second user the method blocks are repeated except the initializing block. In another example, when the first query is resubmitted another time by the first user the method blocks are repeated except the assigning and the initializing blocks.

Depending on the first tag (and associated counter) assigned to the first pattern and the first user, the significance value of the first pattern may be increased or decreased. For example, the first pattern may be flagged by the first user using a second tag of the set of tags in another time interval (e.g. the relevance of a pattern may be time dependent; it is relevant today but not next year) and therefrom the tag counter of the set of tag counters corresponding to the second tag is incremented. In this case, depending on the first and second tag (and associated counters) assigned to the first pattern and the first user, the significance value of the first pattern may be increased or decreased.

For example, in case the set of tags includes two data category tags e.g. noise data category and non-noise data category tag. If the first tag is a noise data category, the significance value of the first pattern may be decreased by, for example, 10% to 90% (e.g. if the first pattern is flagged with the first tag two times by the first user then the associated counter may be increased twice and then the significance value of the first pattern may be decreased by for example 20%, while if the first pattern is flagged with the first tag 5 times by the first user the significance value of the first pattern may be decreased by for example 60%). While if the first tag is a non-noise data category tag, the significance value of the first pattern may be increased by, for example, 5% to 100%. In case, the first pattern is flagged with the first tag and with the second tag, a combination of the associated counters may be used to adjust the significance value of the first pattern. In case, the first pattern is flagged 2 times with the first tag and 20 times with the second tag, the significance value of the first pattern may be increased since the tag counter associated with non-noise tag is much higher than the tag counter associated with the noise tag. This embodiment may be advantageous as it may provide a reliable method for adjusting significance values and thus providing an optimal ranking of patterns based on the adjusted significance values.

The method may further include using a weighted sum of the set of tag counters to adjust the significance value of the first pattern. At least two categories include a noise, trivial and valid category patterns, where the adjusting of the significance value $(s(r))$ is performed using the formula: $s'(r,u)=s(r)-w*(r(p,u)-0.5)$, where $r(p,u)=(nn(p,u)+nt(p,u))/(nv(p,u)+nn(p,u)+nt(p,u))$, where $nv(p,u)$, $nn(p,u)$, $nt(p,u)$ are the tag counters corresponding to the valid, noise and trivial categories respectively, where w is a predefined weight value. For example, the predefined weight value w may be used to switch on or off the adjustment of the significance value e.g. w=0 means that the adjustment is switched off.

The method may further include receiving at the database system from a second user a second query for the dataset; providing a second set of patterns in the dataset with respective significance values in response to the received second query; receiving, from the second user, input information indicating tags of at least a second subset of patterns of the second set of patterns; determining a number of identical patterns flagged with the same tag between the first and second subset; in response to a determination that the number of identical patterns is higher than a predefined similarity threshold value, assigning, to each pattern of the identical patterns and to both the first and second user, a common set of tag counters corresponding to the set of tags respectively. The common set of tag counters may be a combination of respective set of tag counters assigned separately to the first and second user; adjusting the significance values of the identical patterns using the common tag counters.

As soon as the first and second users are similar in the sense that they agree on the number of tagged patterns that is higher than the predefined similarity threshold value, the common/collaborative tag counters of the two users may be used. The advantage of this embodiment may be that it may allow analysts to use the same tools they use (there is no need for explicit collaboration between them) but have results boosted or down-rated using the feedback of a large user-base.

The method may further include receiving at the database system from a third user a third query for the dataset; providing a third set of patterns in the dataset with respective significance values in response to the received third query; receiving, from the third user, input information indicating tags of at least a third subset of patterns of the third set of patterns; determining a second number of identical patterns flagged with the same tag between the first, second and third subset; in response to a determination that the second number of identical patterns is higher than the predefined similarity threshold value, assigning, to each pattern of the identical patterns and to the first, second and third user, a common set of tag counters corresponding to the set of tags respectively. The common set of tag counters may be a combination of respective set of tag counters assigned separately to the first second user and third user; adjusting the significance values of the second number of identical patterns using the common tag counters.

In another example, a clustering analysis may be used to group two or more users in such a way that the users in the same group are similar. The clustering analysis may be for example a centroid-based clustering or any suitable clustering method. In case of centroid-based clustering, a cluster may be represented by a central vector. The central vector may be defined, for example, using identical patterns between the first subset and second subsets of patterns. The central vector may include, for example, of at least part of the identical patterns and associated tags. To check whether the third user may also belong to this cluster formed by the two similar first and second users, a vector of the third subset of patterns may be created. That vector includes the third subset of patterns and associated tags. The centroid-based clustering may then compare the vector with the central vector to determine whether the third user can belong to the cluster.

The method may further include determining identical patterns between the first subset of patterns and non-flagged patterns of the second set of patterns; assigning the tag of each pattern of the first subset to its identical non-flagged pattern of the second set of patterns. Since the first and second users are similar, a collaborative flagging of patterns may be used. This may avoid tagging the same pattern twice by similar users, and thus may further save resources.

The method may further include receiving from one of the first user and a second user the first query for the dataset; providing an updated set of patterns with respective updated significance values. At least part of the updated set of patterns (e.g. the first subset of patterns) includes patterns for which the significance values have been adjusted. The patterns that belong to the updated set of patterns may be selected based on their ranking i.e. significance value that is compared with the significance threshold value. The method may further include determining that a first pattern of the first subset of patterns is a parent pattern of a non-flagged second pattern of the first set of patterns; flagging the second pattern using the tag of the first pattern; adjusting the significance value of the second pattern based on the tag of the first pattern. This may avoid tagging the sub-patterns, and thus may further save resources. The method may further include ranking the first set of patterns using the respective significance values including the adjusted significance values; storing the dataset based on the ranked patterns.

The method may further include storing data corresponding to the highest ranked patterns in an in-memory database. This may facilitate the access to the data in the database system. For example, the data corresponding to the lowest ranked patterns may be archived as they may not be often used by the first user.

In another aspect, the invention relates to a computer program product or a database system. A receiver module receives from a first user a first query for a dataset stored in the database system. A pattern module provides a first set of patterns in the dataset and, for each pattern in the first set of patterns, a significance value in response to the received first query. The pattern module also provides a set of tags for flagging a pattern of first the set of patterns, where the set of tags indicates at least two data categories describing the pattern. The receiver module is adapted to receive from the first user, input information indicating tags of at least a first subset of patterns of the first set of patterns, where each tag of the tags is selected from the set of tags. An analysis module for adjusting the significance values of the first subset of patterns based on the tags.

In the following, like numbered elements in the figures either designate similar elements or designate elements that perform an equivalent function. Elements which have been discussed previously will not necessarily be discussed in later figures if the function is equivalent.

Figure 1:
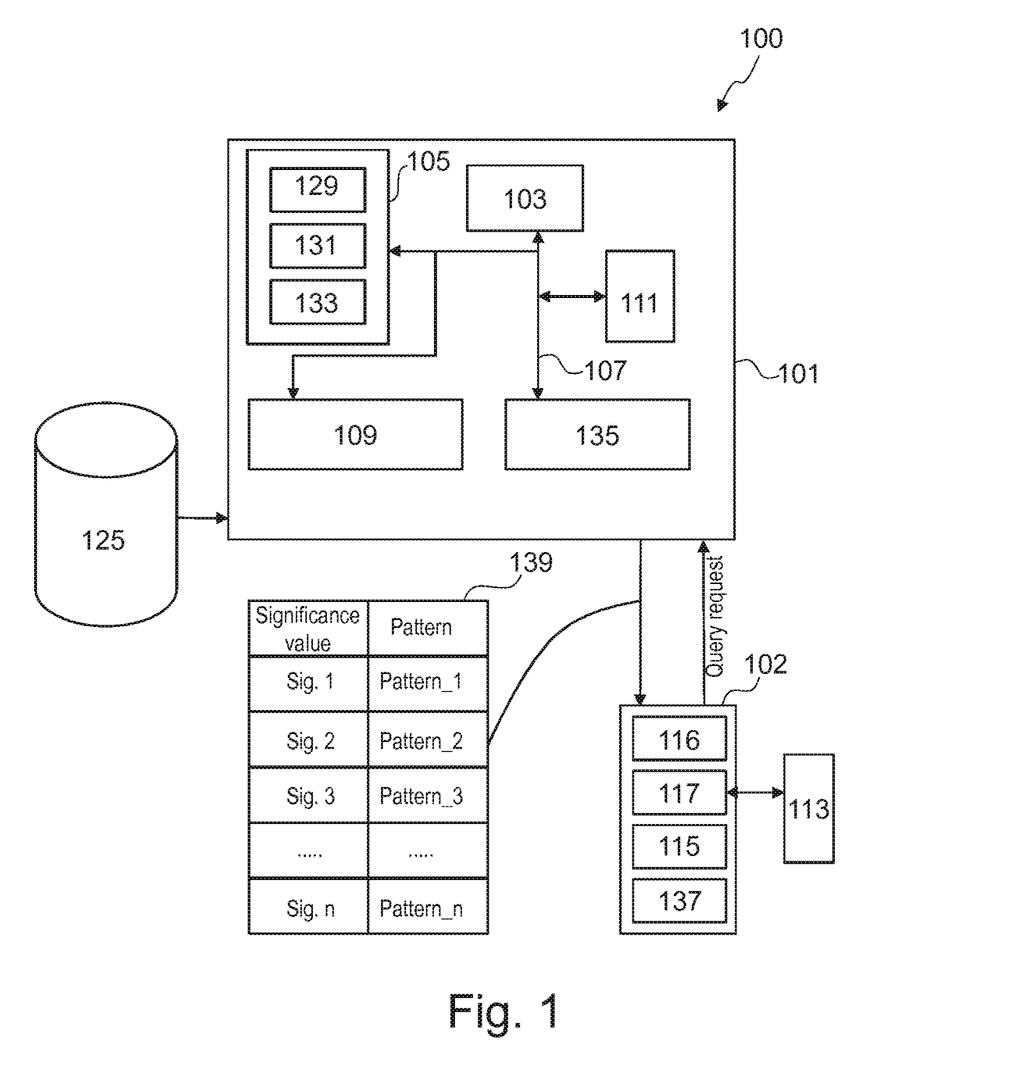
FIG. 1 illustrates a system for data pattern recognition.

FIG. 1 depicts exemplary system 100 for data pattern recognition. For example, the system 100 may be part of an Enterprise system of IBM® utilizing an IBM DB2 database system.

The system 100 provides a computer system 101 and one or more client systems 102. Computer system 101 and client system 102 may be remote from each other and communicate over a network. The network may be implemented by any number of any suitable communications media (e.g., wide area network (WAN), local area network (LAN), Internet, Intranet, etc.). Alternatively, computer system 101 and client system 102 may be local to each other, and communicate via any appropriate local communication medium (e.g., local area network (LAN), hardwire, wireless link, Intranet, etc.).

The components of computer system 101 may include, but are not limited to, one or more processors or processing units 103, a storage system 111, a memory system 105, and a bus 107 that couples various system components including memory system 105 to processor 103. Memory system 105 may include computer system readable media in the form of volatile memory, such as random access memory (RAM) and/or cache memory.

Computer system 101 typically includes a variety of computer system readable media. Such media may be any available media that is accessible by computer system 101, and it includes both volatile and non-volatile media, removable and non-removable media.

Computer system 101 can communicate with one or more networks such as a local area network (LAN), a general wide area network (WAN), and/or a public network (e.g., the Internet) via network adapter 109. As depicted, network adapter 109 communicates with the other components of computer system 101 via bus 107. Computer system 101 may communicate with one or more other computing devices. Such communication can occur via I/O interface(s) 135.

The computer system 101 may act as a database management server system. The computer system 101 may include and implement a database management system such as SQL and/or DB2 database management systems, and manages information within a database system 125. Database system 125 may be implemented by any conventional or other database or storage unit, may be local to or remote from computer system 101, and may communicate via any appropriate communication medium (e.g., local area network (LAN), wide area network (WAN), Internet, hardware, wireless link, Intranet, etc.).

The database system 125 is adapted to store data and to handle data request access to the database system 125. The database system 125 may be an internal resource of the computer system 101 or an external and/or an independent resource of the computer system 101.

Client system 102 includes at least one processor 116, one or more memories 117. Client system 102 may also communicate with one or more external devices such as a keyboard, a pointing device, a display 113, etc.; one or more devices that enable a user to interact with client system 102; and/or any devices (e.g., network card, modem, etc.) that enable client system 102 to communicate with one or more other computing devices. Such communication can occur via I/O interface(s) 115.

Client system 102 may present or utilize a graphical user (e.g., GUI, etc.) or other type of interface (e.g., command line prompts, menu screens, applications, programming interfaces, etc.) to ascertain information pertaining to requests for data, and may provide reports or displays including various information. The client system 102 includes one or more client applications 137 that perform various processing and may provide requests for data to computer system 101.

Memory system 105 is configured to store applications that are executable on the processor 103. For example, the memory system 105 may include an operating system as well as application programs. For example, memory system 105 includes a receiver module 129, pattern module 131 and an analysis module 133.

The receiver module may receive data requests from a user of the client system 102 for data stored in the database system 125. The pattern module 131 may define the patterns in the data requested by the user and send to the client system 102 a list or table 139 of patterns and their respective signification values. The analysis module 133 enables calculation of the signification values as well as the ranking of the patterns. A pattern may be any kind of relationship between a set of variables that can be assigned a statistical significance. In market-basket analysis, this relationship would be between variables, denoting whether a given product was purchased, pointing out that, if product A was purchased, product B might be probable to also be purchased. In engineering, this could be that if a fault of type X occurs and shortly after that a fault of type Y, then a fault of type Z is likely to follow.

Figure 2:
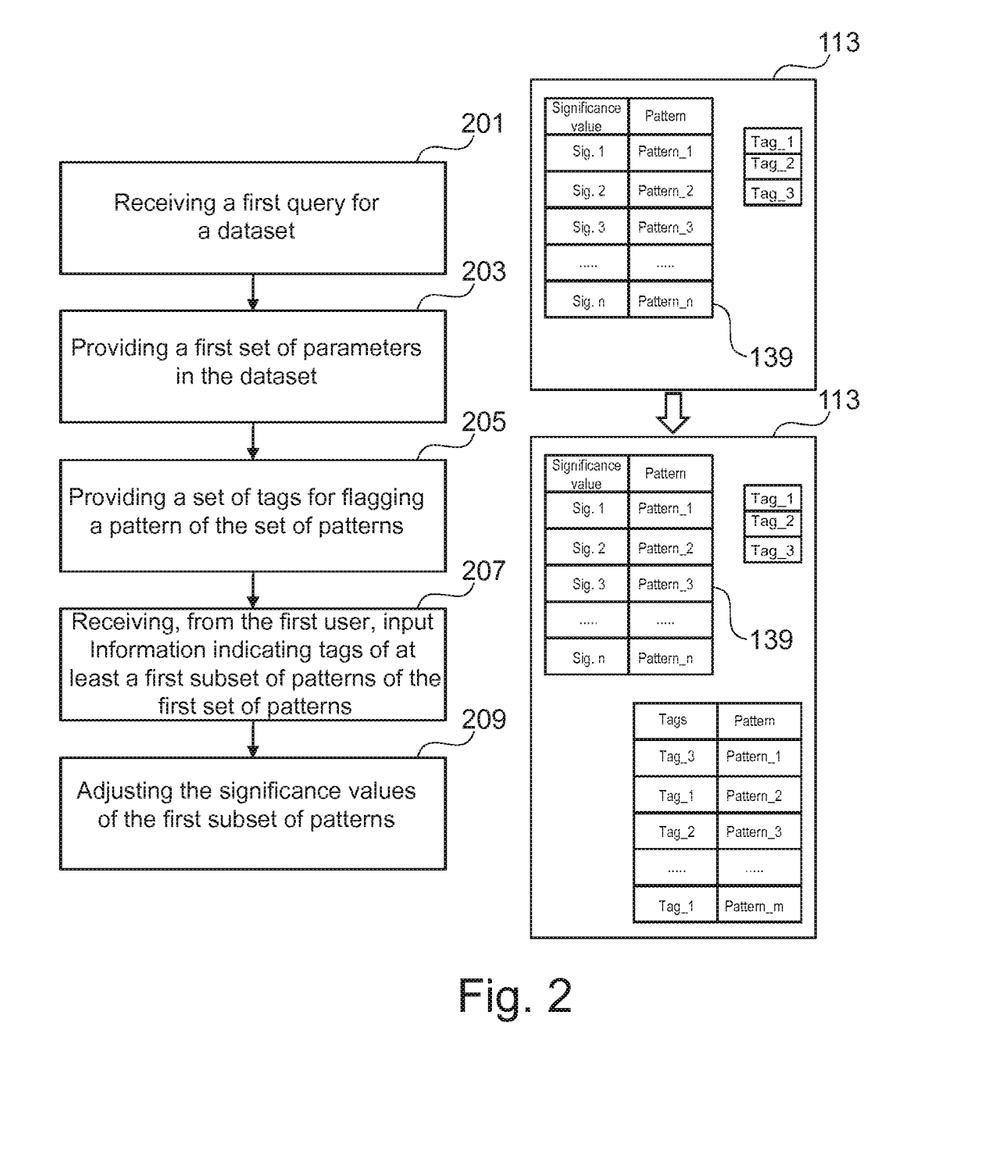
FIG. 2 is a flowchart of a method for accessing data in the database system.

The operation of the system 100 will be described in details with reference to FIG. 2-4. FIG. 2 is a flowchart of a method for accessing data in the database system 125. In block 201, the receiver module 129 receives from a first user e.g. via the client system 102 a first query for a dataset stored in the database system 125. For example, the first query may indicate the first user preferences and may include key words, phrases, example items or parts of items such as images, emails, SMS messages or other items. The first query may include, for example, a Structured Query Language (SQL) or Multidimensional Expressions (MDX) query, or it may alternatively conform to any other suitable format or language. The first query may be entered by the first user as input to the client system 102 e.g. using the keyboard. The first query may be sent by the client system 102 to the computer system 101.

In response to receiving the first query, the pattern module 131 may return a first set of patters in block 203. Each pattern in the set of patterns is associated with a significance value.

The term "significance" or "statistical significance" as used herein refers to a probability measure of how strongly the data support a certain result (usually of a statistical test).

A significance value for a pattern may be determined using for example the list measure. For example, the lift measure may denote how much more often a combination of literals appears, compared to the expected frequency, assuming that the literals were statistically independent. To calculate the lift, the number of occurrences of all literals, as well as their conjunction needs to be counted from a database. This can be done, for instance, with the APRIORI algorithm.

In block 205, the pattern module 131 may provide or make available a set of tags tag_1-tag_3 for flagging a pattern of the set of patterns Pattern_1-Pattern_n.

This may be done, for example, by displaying the set of tags tag_1-tag_3 on the display 113 of the client system 102. Alternatively or additionally the set of tags tag_1-tag_3 may be sent to a client application 135 of the client system 102.

The system may provide historical data of patterns and associated tags, such that they may be used to determine the tag with which a pattern may be flagged. The determination of a tag to be assigned to a given pattern may be done using the historical data associated with a pattern that is similar or relates to the given pattern.

The set of tags tag_1-tag_3 indicate at least two data categories describing the pattern. The at least two data categories include a noise data category and a non-noise data category. The non-noise category may include a valid and a trivial data patter.

A pattern is trivial, if it may be known to a practitioner in a field. For example, the pattern according to which an "out of memory error" is always followed by a "spike in CPU usage" is known in the field of computing. Such pattern may thus be flagged as trivial. In another example, the frequency of appearance of a pattern may be used to determine whether that pattern is trivial or not. For example, if a pattern appears in the computer system since a long time period e.g. 1 year and it is frequency of appearance for the queries of the first user is higher than a predetermined threshold e.g. once per day then it may be classified automatically or by the first user as trivial.

A noise pattern may result from a random process that appears in conjunction with a systematic process without meaning Noise pattern can be caused by hardware failures or programming errors. For example, measures of CPU usage may be wrong when there is an issue with the software. The noise pattern may also include pattern associated with corrupt data or any pattern that cannot be read or used by a program.

For example, data pattern may be identified using information derived from historical data (e.g. the logs). A valid pattern is a pattern that is neither noise nor trivial pattern.

In block 207, the receiver module 129 receives input information indicating tags of at least a first subset of patterns pattern_1-pattern_m of the first set of patterns pattern_1-pattern_n (m<=n). Each tag of the tags is selected from the set of tags tag_1-tag_3. The input information may be received from the first user who selected the tags and assigned them to the first subset of patterns pattern_1-pattern_m. Alternatively, the tags may be automatically assigned to the first subset of patterns pattern_1-pattern_m, by for example using historical data stored in the client system 102 that may give hint on the data category of the subset of patterns pattern_1-pattern_m. In this case, the input information may be received from the client system 102 e.g. from the client application 137.

In block 209, the analysis module 131 adjusts the significance values Sig_1-Sig_m of the first subset of patterns pattern_1-pattern_m based on the tags tag_1-tag_3 assigned to each pattern of the first subset of patterns. A method for adjusting the significance values is described with reference to FIG. 3.

Figure 3:
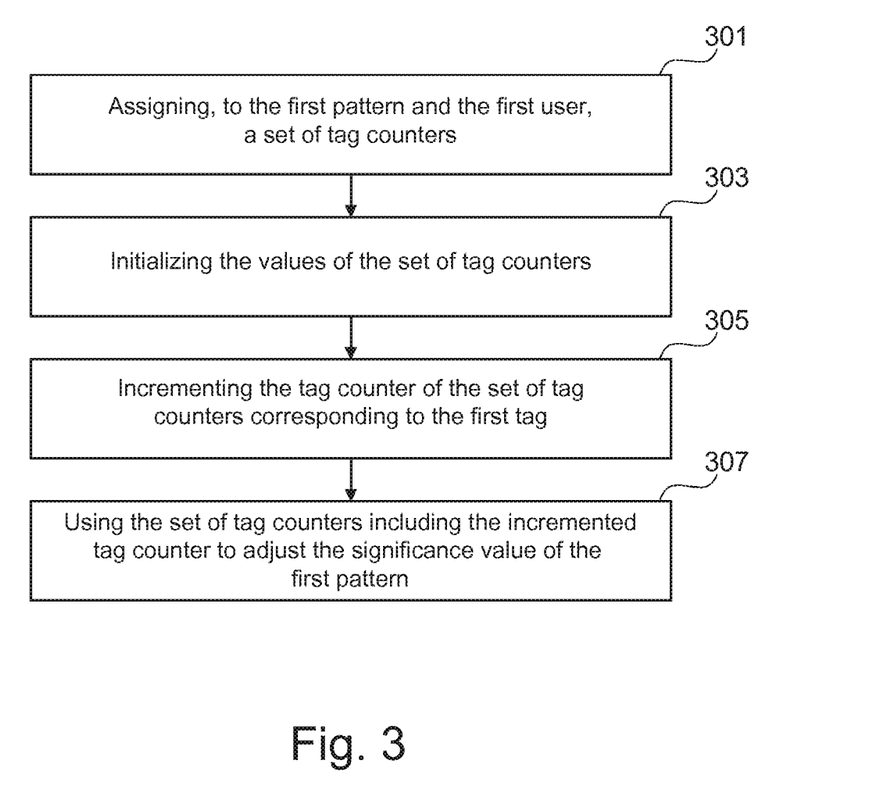
FIG. 3 is a flowchart of an exemplary method for adjusting the significance value of a pattern.

FIG. 3 is a flowchart of a method for adjusting the significance value s(p1) of a first pattern p1 of the first subset of patterns pattern_1-pattern_m based on their respective tags tag_1-tag_3. The pattern p1 is flagged with a first tag e.g. tag_1 of the set of tags tag_1-tag_3.

For simplicity of the description, only one pattern is used to describe the significance value calculation; however, the skilled person in the art will easily understand that the present method may be equally applied to each pattern of the first subset of patterns pattern_1-pattern_m and may be generalized to all patterns of the first subset of patterns pattern_1-pattern_m.

In block 301, a set of tag counters nv(p1,u1), nt(p1,u1), nn(p1,u1) corresponding to the set of tags tag_1-tag_3 respectively (e.g. tag_1, tag_2 and tag_3 include valid category, trivial category and noise category tag respectively) are assigned to the first pattern p1 and the first user u1.

In block 303, the values of the set of tag counters nv(p1,u1), nt(p1,u1), nn(p1,u1) are initialized e.g. to zero or any other number. For example, tag counters may be initialized with different values so as for example to put more weight on a certain category than the other.

In block 305, the tag counter $nv(p1, u1)$ of the set of tag counters $nv(p1,u1)$, $nt(p1,u1)$, $nn(p1,u1)$ corresponding to the first tag tag_1 is incremented e.g. by one or any other number. Since the first pattern p1 is flagged by tag_1 that is a valid category tag, the corresponding counter of valid category tag is incremented. This may result, for example, in values $nv(p1,u1)=1$, $nt(p1,u1)=0$, $nn(p1,u1)=0$.

In block 307, the set of tag counters including the incremented tag counter (i.e. $nv(p1,u1)=1$, $nt(p1,u1)=0$, $nn(p1, u1)=0$) are used to adjust the significance value of the first pattern p1.

The adjustment may be done, for example, by providing a term that corrects the significance value $s(p1)$. That term may be a function e.g. a combination of the counters $nv(p1,u1)=1$ $nt(p1,u1)=0$ and $nn(p1,u1)$. For example, the counters $nv(p1,u1)=1$, $nt(p1,u1)=0$, $nn(p1,u1)=0$ are combined into a single measure (other measures to combine these counters may be used instead) by calculating $r(p1,u1)=(nn(p1,u1)+nt(p1,u1))/(nv(p1,u1)+nn(p1,u1)+nt(p1,u1))$. This value is subsequently used to either increase or decrease the significance $s(p1)$ of the pattern p1 for the first user u1. The original significance may be based on the data and independent of the first user u1. If $(nv(p1,u1)+nn(p1,u1)+nt(p1,u1)=0$ the significance $s(p)$ remains unchanged. Otherwise, the adjusted significance may be calculated as follows $s'(r,u1)=s(p1)-w*(r(p1,u1)-0.5)$; where w is a weighting factor to be chosen by the user u1.

For example, multiple analysts may analyze patterns on a given dataset. A typical scenario may be technicians analyzing fault data of a technical system. This could be data about a single system, or even data collected from many different systems. Each expert working on the data may be presented with a list of result patterns based on some query to the system. This list may be ranked according to significance values. As the amount of feedback required from one user could be high, the systems may combine insights of these experts in a non-obtrusive way, thus in a way that does not require any explicit communication or coordination between experts. This may be done for example by creating a profile of what a given expert would regard as trivial, noise and valid, based on her feedback. This profile is then used to identify similar users as shown with reference to FIG. 4.

Figure 4:
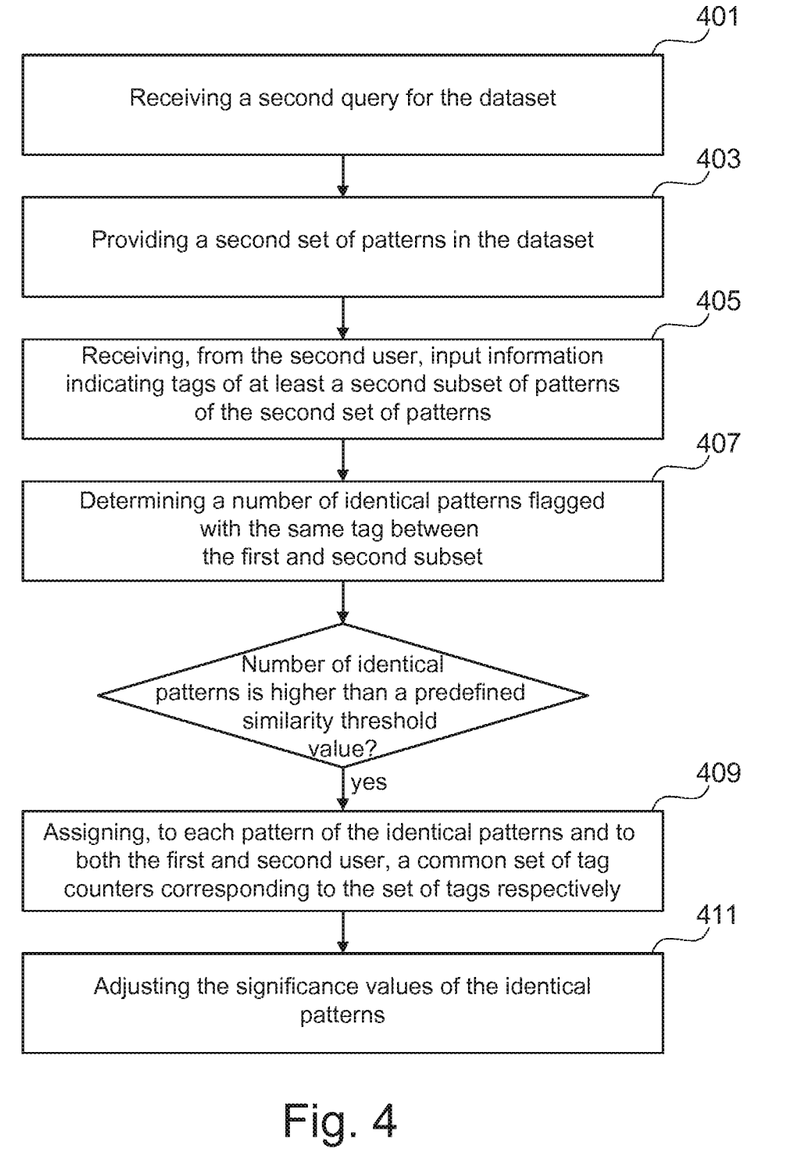
FIG. 4 is a flowchart of another exemplary method for adjusting the significance values of patterns.

FIG. 4 is a flowchart of another exemplary method for adjusting the significance values of patterns. In block 401, the database system receives from a second user u2 a second query for the dataset. The second query may include at least part of the first query.

In response to the second query, a second set of patterns pattern_m–5-pattern _v in the dataset with respective significance values is provided is block 403.

In block 405, input information indicating tags of at least a second subset of patterns pattern_m–9-pattern_m+6 of the second set of patterns pattern_m–5-pattern_v is received from the second user u2.

In block 407, a number of identical patterns flagged with the same tag between the first and second subset is determined. This may be done, for example, by first determining identical patterns i.e. pattern_m–9-pattern_m, then, selecting patterns having the same tags in both first and second subsets e.g. pattern_m–5-pattern_m.

In block 409, it is determined that the number of identical patterns pattern_m–5-pattern_m is higher than a predefined similarity threshold value e.g. 4 patterns. In this case the first and second user may be considered as similar users.

In another example, in case the agreement (e.g. number of identical patterns having the same tag) is higher than the disagreement (e.g. number of identical patterns having different tag) between the first and second users, the two users may be considered as similar and thus their tag counts may be combined. Complex measures, such as cosine or Jaccard may be used for determining that the first and second users are similar. For that, a similarity metric may be computed based on the Jaccard coefficient or the cosine similarity measure. The similarity metric may determine correlation between first and second subset of patterns.

In addition or alternatively, the significance values of the identical patterns pattern_m–5-pattern_m may be used to determine whether the first and second users are similar. For example, if the mean difference between respective significance values of the identical patterns pattern_m–5-pattern_m in the first and second subsets is smaller than a predefined significance threshold, both users may be considered as similar.

After determining that the two users are similar (e.g. the number of identical patterns pattern_m–5-pattern_m is higher than the predefined similarity threshold value) a common set of tag counters corresponding to the set of tags tag_1-tag _3 respectively is assigned to each pattern of the identical patterns pattern_m–5-pattern _m and to both the first and second user, $nv(px,u1,u2)$, $nt(px,u1,u2)$, $nn(px,u1,u2)$, where $m-4<x<m+1$. The common set of tag counters is a combination of respective set of tag counters assigned separately to the first and second user. For example, for pattern m that belongs to both first and second subset and having the same tag in both subsets, the common set of counters $nv(pm,u1,u2)$, $nt(pm,u1,u2)$, $nn(pm,u1,u2)$ may be determined by combining the tag counters $nv(pm,u1)$, $nt(pm,u1)$, $nn(pm,u1)$ assigned to pattern_m and to the first user and the tag counters $nv(pm,u2)$, $nt(pm,u2)$, $nn(pm,u2)$ assigned to pattern_m and to the second user.

For example, the combination may be an arithmetic sum such that:

$nv(pm,u1,u2)=nv(pm,u1)+nv(pm,u2)$ $nt(pm,u1,u2)=nt(pm,u1)+nt(pm,u2)$ $nn(pm,u1,u2)=nn(pm,u1)+nn(pm,u2)$

In block 411, the significance values of the identical patterns pattern_m–5-pattern_m are adjusted using the common tag counters. For example, for pattern_m the adjusted significance value may be $s'(r,u1,u2)=s(pm)-w*(r(pm,u1,u2)-0.5)$, where $r(pm,u1,u2)=(nn(pm,u1,u2)+nt(pm,u1,u2))/(nv(pm,u1,u2)+nn(pm,u1,u2)+nt(pm,u1,u2))$.

Thus, a re-ranking based on this combined/collaborative tag counts may be run for each user separately, instead of running them globally.

Consequently, the information used to re-rank patterns based on feedback is not only drawn from the feedback of a single user, but from all users that are similar to her.

In case of more than two users e.g. three users u1, u2 and u3 the block 407 is executed a number of identical patterns flagged with the same tag between the first, second and third subset is determined. The third subset is provided by the third user as in block 405. In this case, the common set of tag counters is a combination of respective set of tag counters assigned separately to the first, second user and third users.

In the following, simplified examples are given to further clarify the method. In this example, are described patterns that are conjunctions of literals, assumed to co-occur in a context, such as a time window. As an example, the following may be a possible pattern:

(Machine1-failure_tn) AND (Humidity_tn>3.4) AND (Machine2-failure_tn+1)

This pattern could either be well-known to the experts (Machine2 always fails after Machine1 fails), invalid (this is a pure coincidence) or a new insight that actually helps to uncover errors and fix them in the future.

However, since the number of possible patterns is huge, there might not be much overlap between individual users. Therefore, a method to generalize over individual patterns to be able to facilitate this knowledge-transfer efficiently may be used.

The counts for nv, nn, nt could be very sparse, if all patterns were considered to be completely different and unrelated. Therefore the following rules to push counts from one pattern p to its related patterns may be used.

The subset relations among patterns may be used to achieve this. A pattern p is a sub pattern of another pattern p', if p logically entails p'. Thus, a sub pattern is a super set of items.

X AND Y AND Z would be a sub pattern of a pattern X AND Y.

Any sub pattern of a pattern flagged as noisy is also flagged as noisy. Thus, if a user flags pattern p as noise, then nn(p) is increased by one, but also nn(p') is increased by one, for all patterns p' that are sub patterns on p.

If a pattern is flagged as trivial, then all patterns p' that this pattern is a sub-pattern of are also flagged as trivial, increasing their nt count.

The counts n(p), nt(p) and nn(p) may not global, but could be different for each user u.

In another example, the system may return to the user initially the following three patterns (Machine1-failure_tn) AND (Humidity_tn>3.4) AND (Machine2-failure_tn+1)–P1

(Machine2-failure_tn) AND (Machine3_slow_tn) AND (Machine7-slow_tn+3)–P2

(Machine5-failure_tn) AND (Load_Machine5_tn>8) AND (Machine1-failure_tn)–P3 with significance values s(P1)=0.3 s(P2)=0.29 and s(P3)=0.27.

The user u1 would flag P1 as noise (Humidity cannot have an influence based on his expertise) and the other two patterns as valid. nn(P1,u1)=1 and nv(P2,u1)=nv(P3,u1)=1 all other values zero.

Running the system again, she would decrease a threshold and get an additional pattern P4:

(Machine1-failure_tn) AND (Humidity_tn>3.4) AND (Machine2-failure _tn+1) AND (Machine 4-slow)–P4 with s(P4)=0.31.

The system would now, based on the feedback of P1, set nn(P4,u1)=1 as well, which would lead to the patterns P1 and P4 both down-ranked with s'(P1,u1)=0.3-0.1*0.5=0.25 and s'(P4,u1)=0.26 if w=0.1 is used. And the pattern to be presented to u1 would be in the following order P2, P3, P4, P1. Another user could now agree with user u1 by ranking patterns similarity. Even if this user did not rate pattern P1 or P4 yet, it would automatically get nn(P1,u2)=1 and nn(P4,u2)=1 based on the rating of user u1. A third user u3 might have rated pattern differently than u1 and is thus not considered as similar. In this case, the counts for this user would be untouched by the ratings of u1.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational blocks to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, blocks, operations, elements, and/or components, but do not preclude the presence or addition of one more other features, integers, blocks, operations, element components, and/or groups thereof.

The corresponding structures, materials, acts, and equivalents of all means or block plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    receiving, from a first user, a first query for a dataset stored in a database;
    responsive to receiving the first query, providing a first set of patterns in the dataset with first respective significance values;
    providing a set of tags for flagging a first pattern in the first set of patterns, the set of tags indicating at least two data categories describing the pattern;
    receiving, from the first user, input information indicating tags of at least a first subset of patterns of the first set of patterns, wherein the tags are selected from the set of tags; and
    adjusting the first significance values of the first subset of patterns based on the tags;
    receiving, from a second user, a second query for the dataset;
    providing a second set of patterns in the dataset with second respective significance values in response to the received second query;
    receiving, from the second user, input information indicating tags of at least a second subset of patterns of the second set of patterns;
    determining a number of identical patterns flagged with a same tag between the first and second subset;
    in response to a determination that the number of identical patterns is higher than a predefined similarity threshold value, assigning, to each pattern of the identical patterns and to both the first and second user, a common set of tag counters corresponding to the set of tags respectively, wherein the common set of tag counters is a combination of respective set of tag counters assigned separately to the first and second user; and
    adjusting the significance values of the identical patterns using the common tag counters.

2. The method of claim 1, wherein the first pattern of the first subset of patterns is flagged with a first tag of the set of tags, wherein the adjusting of the first significance value of the first pattern comprises:
- assigning, to the first pattern and the first user, a set of tag counters corresponding to the set of tags respectively;
- initializing the values of the set of tag counters;
- incrementing the tag counter of the set of tag counters corresponding to the first tag;
- using the set of tag counters including the incremented tag counter to adjust the significance value of the first pattern.

3. The method of claim 2, further comprising using a weighted sum of the set of tag counters to adjust the significance value of the first pattern.

4. The method of claim 2, wherein the at least two categories comprise a noise, trivial and valid category patterns, wherein the adjusting of the significance value (s(r)) is performed using the formula: $s'(r,u)=s(r)-w*(r(p,u)-0.5)$, where $r(p,u)=(nn(p,u)+nt(p,u))/(nv(p,u)+nn(p,u)+nt(p,u))$, where $nv(p,u)$, $nn(p,u)$, $nt(p,u)$ are the tag counters corresponding to the valid, noise and trivial categories respectively, wherein w is a predefined weight value.

5. The method of claim 1, further comprising
- receiving, from a third user, a third query for the dataset;
- providing a third set of patterns in the dataset with respective significance values in response to the received third query;
- receiving, from the third user, input information indicating tags of at least a third subset of patterns of the third set of patterns;
- determining a second number of identical patterns flagged with the same tag between the first, second and third subset;
- in response to a determination that the second number of identical patterns is higher than the predefined similarity threshold value, assigning, to each pattern of the identical patterns and to the first, second and third user, a common set of tag counters corresponding to the set of tags respectively, wherein the common set of tag counters is a combination of respective set of tag counters assigned separately to the first second user and third user; and
- adjusting the significance values of the second number of identical patterns using the common tag counters.

6. The method of claim 5, further comprising:
- determining identical patterns between the first subset of patterns and non-flagged patterns of the second set of patterns;
- assigning the tag of each pattern of the first subset to its identical non-flagged pattern of the second set of patterns.

7. The method of claim 1, further comprising:
- receiving from one of the first user and the second user the first query for the dataset;
- providing an updated set of patterns with respective updated significance values.

8. The method of claim 1, further comprising:
- determining that a first pattern of the first subset of patterns is a parent pattern of a non-flagged second pattern of the first set of patterns;
- flagging the second pattern using the tag of the first pattern;
- adjusting the significance value of the second pattern based on the tag of the first pattern.

9. The method of claim 1, further comprising:
- ranking the first set of patterns using the respective significance values;
- storing the dataset based on the ranked patterns.

10. The method of claim 9, further comprising storing data corresponding to the highest ranked patterns in an in-memory database.

11. A computer program product, comprising:
- a computer readable storage medium having program instructions embodied therewith, wherein the computer readable storage medium is not a transitory signal per se, the program instructions readable by a processor to cause the processor to perform a method comprising:
- receiving a first user a first query for a dataset stored in a database;
- providing a first set of patterns in the dataset, and providing for each pattern in the first set of patterns a first significance value in response to the received first query;
- providing a set of tags for flagging a first pattern in the first set of patterns, the set of tags indicating at least two data categories describing the pattern;
- receiving from the first user, input information indicating tags of at least a first subset of patterns of the first set of patterns, wherein the tags are selected from the set of tags;
- adjusting the first significance values of the first subset of patterns based on the tags;
- receiving, from a second user, a second query for the dataset;
- providing a second set of patterns in the dataset with respective significance values in response to the received second query;
- receiving, from the second user, input information indicating tags of at least a second subset of patterns of the second set of patterns;
- determining a number of identical patterns flagged with a same tag between the first and second subset;
- in response to a determination that the number of identical patterns is higher than a predefined similarity threshold value, assigning, to each pattern of the identical patterns and to both the first and second user, a common set of tag counters corresponding to the set of tags respectively, wherein the common set of tag counters is a combination of respective set of tag counters assigned separately to the first and second user; and
- adjusting the significance values of the identical patterns using the common tag counters.

12. The computer program product of claim 11, wherein the first pattern of the first subset of patterns is flagged with a first tag of the set of tags, wherein the adjusting of the significance value of the first pattern comprises:
- assigning, to the first pattern and the first user, a set of tag counters corresponding to the set of tags respectively;
- initializing the values of the set of tag counters;
- incrementing the tag counter of the set of tag counters corresponding to the first tag;
- using the set of tag counters including the incremented tag counter to adjust the significance value of the first pattern.

13. The computer program product of claim 12, further comprising using a weighted sum of the set of tag counters to adjust the significance value of the first pattern.

14. The computer program product of claim 12, wherein the at least two categories comprise a noise, trivial and valid category patterns, wherein the adjusting of the significance value (s(r)) is performed using the formula: $s'(r,u)=s(r)-w*$ (r(p,u)−0.5), where r(p,u)=(nn(p,u)+nt(p,u))/(nv(p,u)+nn(p,u)+nt(p,u)), where nv(p,u), nn(p,u), nt(p,u) are the tag counters corresponding to the valid, noise and trivial categories respectively, wherein w is a predefined weight value.

15. The computer program product of claim 11, further comprising
  receiving, from a third user, a third query for the dataset;
  providing a third set of patterns in the dataset with respective significance values in response to the received third query;
  receiving, from the third user, input information indicating tags of at least a third subset of patterns of the third set of patterns;
  determining a second number of identical patterns flagged with the same tag between the first, second and third subset;
  in response to a determination that the second number of identical patterns is higher than the predefined similarity threshold value, assigning, to each pattern of the identical patterns and to the first, second and third user, a common set of tag counters corresponding to the set of tags respectively, wherein the common set of tag counters is a combination of respective set of tag counters assigned separately to the first second user and third user; and
  adjusting the significance values of the second number of identical patterns using the common tag counters.

16. The computer program product of claim 15, further comprising:
  determining identical patterns between the first subset of patterns and non-flagged patterns of the second set of patterns;
  assigning the tag of each pattern of the first subset to its identical non-flagged pattern of the second set of patterns.

17. The computer program product of claim 11, further comprising:
  receiving from one of the first user and a second user the first query for the dataset;
  providing an updated set of patterns with respective updated significance values.

18. A system, comprising:
  a memory having computer readable instructions; and
  a processor for executing the computer readable instructions, the instructions comprising:
    receiving from a first user a first query for a dataset stored in a database
    providing a first set of patterns in the dataset, and providing for each pattern in the first set of patterns a first significance value in response to the received first query; and for providing a set of tags for flagging a first pattern in the first set of patterns, the set of tags indicating at least two data categories describing the pattern;
  receiving, from the first user, input information indicating tags of at least a first subset of patterns of the first set of patterns, wherein the tags are selected from the set of tags;
  adjusting the first significance values of the first subset of patterns based on the tags;
  receiving, from a second user, a second query for the dataset;
  providing a second set of patterns in the dataset with respective significance values in response to the received second query;
  receiving, from the second user, input information indicating tags of at least a second subset of patterns of the second set of patterns;
  determining a number of identical patterns flagged with a same tag between the first and second subset;
  in response to a determination that the number of identical patterns is higher than a predefined similarity threshold value, assigning, to each pattern of the identical patterns and to both the first and second user, a common set of tag counters corresponding to the set of tags respectively, wherein the common set of tag counters is a combination of respective set of tag counters assigned separately to the first and second user; and
  adjusting the significance values of the identical patterns using the common tag counters.

* * * * *